(No Model.)

E. F. BAKER.
COMBINED PLOW AND PULVERIZER.

No. 355,292. Patented Jan. 4, 1887.

Witnesses
J. H. Parsons.
J. R. Drake.

E. Freeman Baker,
Inventor,
by J. R. Drake,
Atty.

UNITED STATES PATENT OFFICE.

E. FREEMAN BAKER, OF ORCHARD PARK, NEW YORK.

COMBINED PLOW AND PULVERIZER.

SPECIFICATION forming part of Letters Patent No. 355,292, dated January 4, 1887.

Application filed April 10, 1886. Serial No. 198,438. (No model.)

*To all whom it may concern:*

Be it known that I, E. FREEMAN BAKER, a citizen of the United States, residing at Orchard Park, in the county of Erie and State of New York, have invented certain new and useful Improvements in a Combined Plow and Pulverizer; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a pulverizer adapted to be applied to plows; and it consists in the improved construction and combinations of parts hereinafter fully described, and pointed out in the claim.

Figure 1:
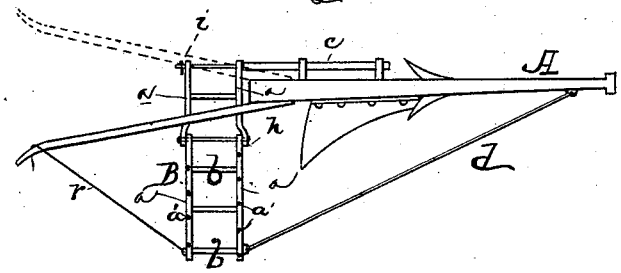
Figure 2:
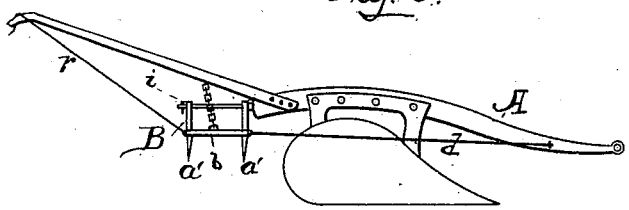
Figure 3:
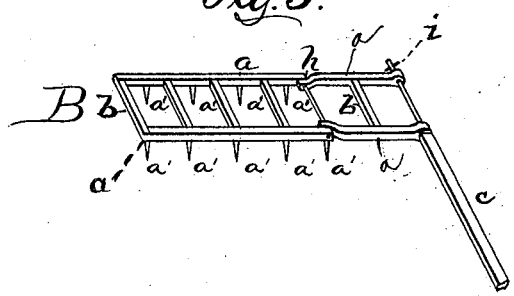

In the drawings, Figure 1 is a top plan of a plow having my pulverizer attached; Fig. 2, a side elevation; Fig. 3, a perspective of pulverizer detached.

A represents a plow, (any style or kind, with one or two mold-boards.)

B is the pulverizer, consisting of jointed side frames, $a$ $a$, having downwardly-projecting teeth $a'$ $a'$ $a'$ $a'$, of any suitable form or kind, the teeth alternating in position in the side pieces, $a$ $a$.

$b$ $b$ are cross pieces or braces holding the two sides in place. The inner ends of the sides are formed into eyes, and which set on a rod, $c$, rounded at the end to receive them, and square the rest of the length, (see Fig. 3,) and which is bolted onto the landside to the standards or beam of a plow (see Fig. 1) at about the height necessary to bring the pulverizer-frame, as it projects at right angles to the plow, on top of the earth thrown up and over by the plow, and as the plow proceeds the teeth $a'$ $a'$ $a'$ harrow or pulverize the earth, sod, &c., thrown up by the plow.

A pin, $i$, confines the frame $a$ $a$ on the rod $c$, and a long rod, $d$, which is hooked or swiveled at or near the end of the plow-beam and to the end of the pulverizer-frame, prevents it from receiving too great a strain.

In addition, the frame $a$ $a$ is hinged near the plow at $h$, and a rope, $r$, is attached to the outer end of the frame by a staple, and the other end held by the plowman or attached to the plow-handle, so that he can at once raise the pulverizer when a stump or large stone is encountered and drop it as soon as passed.

The whole device can be taken off by merely taking out the pin $i$ and unhooking the rod $d$. It folds up by the hinge $h$ and can be put away when not in use.

The rod $c$ is made so as to be adjustable to the plow used, extended from or nearer to the mold-board, according to the kind of plow used.

The frame and teeth described will usually be all that is required; but more can be added, if necessary, according to the soil and power required to overcome resistance.

The end of the pulverizer will usually only extend about twenty inches from the mold-board, enough to take two furrows and pulverize the second time.

I am aware that it is not broadly new to combine with a plow a pivoted harrow, a connection between the forward end of the beam of the plow and the outer end of the harrow, and a connection between the harrow and the handles of the plow for raising the harrow to clear obstructions, and such construction I do not seek to claim, my invention being limited to the construction set forth in the following claim.

I claim—

The combination, with a plow having a rod secured to one side of the beam thereof and extending in rear of said beam, of the jointed bars $a$, having teeth $a'$ and connected by the bars $b$, said jointed bars $a$ being mounted on the rod $c$ at one end and extending to the opposite side of the plow, a rod, $d$, connecting the bars and plow-beam, and means, such as described, for raising said bars, as set forth.

In testimony whereof I affix my signature in presence of two witnesses.

E. FREEMAN BAKER.

Witnesses:
J. R. DRAKE,
G. B. POTTER.